April 28, 1942.                G. E. GAREY                2,280,908
                            TRACTOR WHEEL RIM
                            Filed Dec. 5, 1940
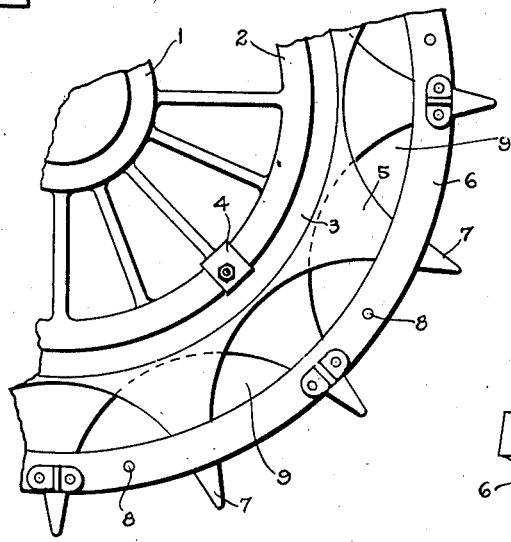
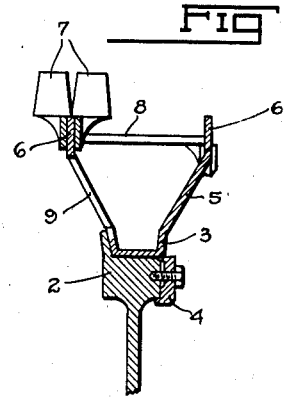
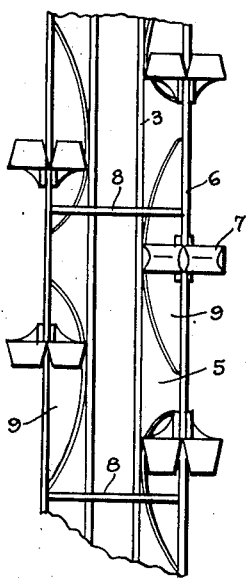
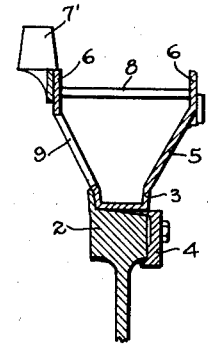
INVENTOR.
GEORGE E. GAREY
BY
Charles R Werner
ATTORNEY.

Patented Apr. 28, 1942

2,280,908

UNITED STATES PATENT OFFICE 2,280,908

TRACTOR WHEEL RIM

George E. Garey, Downs, Kans.

Application December 5, 1940, Serial No. 368,593

6 Claims. (Cl. 301—41)

This invention relates in general to demountable rims for tractor wheels and in particular to a demountable rim incorporating means for preventing the accumulation of mud, snow or other foreign matter between the parts of the rim.

Although there are many forms of rims and wheels to provide suitable traction when moving over various kinds of terrain, to my knowledge there is nothing in the prior art which provides a rim specifically designed to have maximum traction and minimum soil collecting characteristics.

It is also true that it has been found undesirable to use tractors whose wheels or rims pack the soil. The preferred type of tractor wheel for use with farm implements is that which will actually cultivate or loosen the soil while moving across a field, and yet will not gather up or pack the soil in the wheels to overload the tractor's pulling power, and stall said tractor.

It is therefore the object of my invention, first; to provide a wheel rim having flaring flanges, soil escape openings in said flanges, and lugs for providing suitable traction for said rim.

Second; to so locate the escape openings in said flanges as to provide for a minimum of soil accumulation and a maximum of soil elimination.

Other objects as well as the construction and advantages of my invention will be apparent by reference to the following description in connection with the accompanying drawing in which:

Fig. 1 is a fragmentary side elevational view of a portion of a wheel and rim constructed in accordance with my invention.

Fig. 2 is a radial section through the rim mounting lugs shown in Fig. 1.

Fig. 3 is a fragmentary end view of the rim.

Fig. 4 is a partial cross sectional view through a rim showing a modified form of lug.

Referring now to the drawing by numerals of reference, I designates a wheel of any suitable construction, preferably having an annular bead 2.

The rim consists of a channel-shaped member 3 adapted to be positioned on the wheel and abutting the bead 2 when drawn up and locked in place by clamps 4.

The channel member 3 has outwardly extending angular portions 5 which terminate in flanges 6 which carry lugs 7 in a suitable manner. The flanges 6 may be tied together by rods 8.

The outwardly extending angular portions 5 are provided with openings 9, preferably spaced as shown, the openings in one of the angular portions being staggered in relation to the openings in the other angular portion.

It will be obvious from the illustrations (Fig. 2) that as the wheel rotates the earth entering between the two angular portions 5 of the rim will pass out through the openings 9 and consequently will not accumulate between said portions 5. The lugs 7 may be suitably attached to the flanges 6 either in pairs, or in staggered relation to each other, or single lugs 7' may be employed.

Obviously, changes in form, proportion and details of construction may be resorted to without departing from the spirit of my invention and I reserve all rights to such changes as come within the scope of these specifications and the following claims.

Although I have shown and described my wheel rim as being applied to the wheels of a tractor it is obvious that it would be equally effective when used on trucks, gun carriages or other propelled or drawn wheeled vehicles. It can be seen that the ordinary pneumatic tire may be removed and my wheel rim applied when the condition of the terrain prevents easy movement of the vehicle therethrough. It is particularly useful on the dual wheels of trucks where one wheel may be removed on each side and my wheel rims substituted to provide positive traction, while the pneumatic tires prevent excessive sinking of the wheels in the mud.

What I claim as new and desire to secure by Letters Patent is:

1. In a demountable rim for tractor wheels, a channel portion adapted to surround the wheel, outwardly flaring angular flanges on said channel portion, soil escape openings in said flanges, the openings in one flange being staggered in relation to the openings in the other flange, and means for retaining said rim on the wheel.

2. In a demountable rim for tractor wheels, a channel portion adapted to surround the wheel, outwardly flaring angular flanges on said channel portion, spaced soil escape openings in said flanges, the openings in one flange being staggered in relation to the openings in the other flange, a radial flange on each of the outwardly flaring flanges, spaced lugs carried on said radial flanges, and means for retaining said rim on the wheel.

3. In a demountable rim for tractor wheels, a channel portion adapted to surround the wheel, outwardly flaring angular flanges on said channel portion, soil escape openings in said flanges, the openings in one flange being staggered in relation to the openings in the other flange, transverse members tying the flanges together, and means for retaining said rim on the wheel.

4. In a demountable rim for tractor wheels, a channel portion adapted to surround the wheel, outwardly flaring angular flanges on said channel portion, spaced soil escape openings in said flanges, the openings in one flange being staggered in relation to the openings in the other flange, a radial flange on each of the outwardly flaring angular flanges, spaced lugs carried on said radial flanges, transverse members secured to the upstanding flanges tying said flanges together, and means for retaining said rim on the wheel.

5. In a demountable rim for tractor wheels, a channel portion adapted to surround the wheel, outwardly flaring angular flanges on said channel portion, spaced soil escape openings in said flanges, the openings in one flange being staggered in relation to the openings in the other flange, a radial flange on each of the outwardly flaring flanges, spaced lugs carried on said radial flanges, the lugs on one flange being staggered in relation to the lugs on the other flange, and means for retaining said rim on the wheel.

6. In a demountable rim for tractor wheels, a channel portion adapted to surround the wheel, outwardly flaring angular flanges on said channel portion, spaced soil escape openings in said flanges, the openings in one flange being staggered in relation to the openings in the other flange, a radial flange on each of the outwardly flaring flanges, spaced lugs carried on said radial flanges, the lugs being positioned on the flanges between the soil escape openings therein, and means for retaining said rim on the wheel.

GEORGE E. GAREY.